United States Patent
Jacon et al.

(10) Patent No.: US 11,098,607 B2
(45) Date of Patent: Aug. 24, 2021

(54) AIR-FIRE SEAL AND ASSEMBLY COMPRISING SUCH A SEAL

(71) Applicant: SAFRAN AIRCRAFT ENGINES, Paris (FR)

(72) Inventors: Bruno Alexandre Didier Jacon, Moissy-Cramayel (FR); Damien Clément Didier Cordier, Moissy-Cramayel (FR); Gonzague Marie Come Jacques André Elluin, Moissy-Cramayel (FR); Florian Benjamin Kévin Lacroix, Moissy Cramayel (FR); Philippe Didier Edmon André Libéral Nabias, Moissy Cramayel (FR); Julien Vitra, Moissy Cramayel (FR)

(73) Assignee: SAFRAN AIRCRAFT ENGINES, Paris (FR)

( * ) Notice: Subject to any disclaimer, the term of this patent is extended or adjusted under 35 U.S.C. 154(b) by 21 days.

(21) Appl. No.: 16/784,624

(22) Filed: Feb. 7, 2020

(65) Prior Publication Data
US 2020/0173296 A1 Jun. 4, 2020

Related U.S. Application Data

(63) Continuation of application No. 15/920,874, filed on Mar. 14, 2018, now Pat. No. 10,598,037.

(30) Foreign Application Priority Data

Mar. 15, 2017 (FR) ...................................... 1752096

(51) Int. Cl.
*F01D 11/00* (2006.01)
*F01D 21/10* (2006.01)
(Continued)

(52) U.S. Cl.
CPC .......... *F01D 11/008* (2013.01); *F01D 11/005* (2013.01); *F01D 21/12* (2013.01);
(Continued)

(58) Field of Classification Search
CPC ...... F01D 11/005; F01D 11/008; F01D 21/12; F01D 21/14; F01D 25/12; F02C 7/25;
(Continued)

(56) References Cited

U.S. PATENT DOCUMENTS 3,965,066 A * 6/1976 Sterman .................. F01D 9/023
60/800
5,249,812 A * 10/1993 Volden ................... F16J 15/162
277/361
(Continued)

FOREIGN PATENT DOCUMENTS

| EP | 2 275 655 A2 | 1/2011 |
| EP | 3 112 605 A1 | 1/2017 |

(Continued)

OTHER PUBLICATIONS

Search Report as issued in French Patent Application No. 1752096, dated Nov. 29, 2017.

*Primary Examiner* — Igor Kershteyn
(74) *Attorney, Agent, or Firm* — Pillsbury Winthrop Shaw Pittman LLP

(57) ABSTRACT

An air-fire seal designed to be attached to a first tubular member of a turbomachine, such as a bleed duct, and to rest against a second member of the turbomachine, such as an intermediate casing hub, includes an attachment base having an annular shape around a reference axis (Y); a first annular fire-stop lip extending from the attachment base over a first length (L1); and a second annular air-sealing lip extending from the attachment base over a second length (L2) lower than the first length and facing the first lip.

14 Claims, 3 Drawing Sheets

(51) Int. Cl.
  *F01D 25/12* (2006.01)
  *F02C 9/18* (2006.01)
  *F02C 7/25* (2006.01)
  *F16J 15/16* (2006.01)
  *F16J 15/14* (2006.01)
  *F16J 15/447* (2006.01)
  *F01D 21/12* (2006.01)
  *F01D 21/14* (2006.01)

(52) U.S. Cl.
  CPC ............... *F01D 21/14* (2013.01); *F02C 7/25* (2013.01); *F02C 9/18* (2013.01); *F16J 15/162* (2013.01); *F16J 15/4476* (2013.01); *F01D 25/12* (2013.01); *F05D 2240/55* (2013.01); *F05D 2300/211* (2013.01); *F05D 2300/2112* (2013.01); *F05D 2300/43* (2013.01)

(58) Field of Classification Search
  CPC ... F02C 9/18; F16J 15/14; F16J 15/162; F16J 15/4476; F05D 2240/55; F05D 2300/211; F05D 2300/2112; F05D 2300/43
  See application file for complete search history.

(56) References Cited

U.S. PATENT DOCUMENTS

| | | | |
|---|---|---|---|
| 6,751,962 B1* | 6/2004 | Kuwabara | F01D 9/023 60/752 |
| 7,481,037 B2* | 1/2009 | Takaya | F01D 9/023 60/39.37 |
| 7,527,469 B2* | 5/2009 | Zborovsky | F01D 9/041 277/412 |
| 7,908,866 B2* | 3/2011 | Kato | F01D 9/023 60/752 |
| 2004/0139746 A1* | 7/2004 | Soechting | F01D 9/023 60/752 |
| 2008/0236170 A1* | 10/2008 | Weaver | F01D 9/023 60/800 |
| 2010/0247298 A1 | 9/2010 | Nakamura et al. | |
| 2014/0147271 A1 | 5/2014 | Burd | |
| 2017/0292397 A1* | 10/2017 | Taniguchi | F01D 25/12 |

FOREIGN PATENT DOCUMENTS

FR   3 036 136 A1   11/2016
WO   WO 2016/047432 A1   3/2016

* cited by examiner

AIR-FIRE SEAL AND ASSEMBLY COMPRISING SUCH A SEAL

CROSS-REFERENCE TO RELATED APPLICATIONS

This application is a continuation of application Ser. No. 15/920,874 filed Mar. 14, 2018, which claims priority to French Patent Application No. 1752096, filed Mar. 15, 2017, the entire contents of which are incorporated herein by reference in their entireties.

TECHNICAL FIELD

The present invention generally relates to the field of turbomachines for aircrafts, such as two-spool turbofan engines. The invention more particularly relates to a seal for air and fire sealing between two members of a turbomachine, such as a bleed duct and an intermediate casing hub.

STATE OF THE ART

A turbofan engine conventionally comprises a fan ducted by a nacelle, a primary flow annular space and a secondary flow annular space. The air mass sucked by the fan is divided into a primary flow, which circulates in the primary flow space (also called primary flow aerodynamic path), and into a secondary flow, which is concentric with the primary flow and circulates in the secondary flow space (also called secondary flow aerodynamic path). The primary flow space passes through a main body comprising, from upstream to downstream in the gas flow direction, one or more compression stages, for example a low pressure compressor and a high pressure compressor, a combustion chamber, one or more turbine stages, for example a high pressure turbine and a low pressure turbine, and a gas exhaust nozzle.

This turbofan engine comprises on the other hand an intermediate casing the hub of which is arranged between the casing of the low pressure compressor and the casing of the high pressure compressor. The intermediate casing hub can comprise variable bleed valves (VBV), the role of which is to regulate the inlet flow rate to the high pressure compressor, by discharging part of the air off the primary flow space.

FIG. 1 shows, in a partial axial cross-section view, an example of hub 10 of an intermediate casing 11 belonging to a two-spool turbofan engine. This hub 10 comprises two coaxial annular shells, respectively an inner shell 12 and an outer shell 13, mutually connected by an upstream transverse flange 14 and by a downstream transverse flange 15. The upstream flange 14 is arranged downstream of the low pressure compressor 16 whereas the downstream flange 15 is arranged upstream of the high pressure compressor 17. The high pressure compressor 17 generally comprises a succession of variable pitch rotors and stators, enabling the air flow rate passing therethrough to be controlled.

The inner annular shell 12 delimits the primary flow space 18 of the primary flow F1 of the turbofan engine and comprises air inlet ports 19 circumferentially distributed about an axis X of the hub 10, this axis X being the same as the rotation axis of the turbofan engine. Each of the inlet ports 19 is plugged by a corresponding bleed valve 20 for regulating the flow rate of the high pressure compressor 17. The outer annular shell 13 delimits in turn the secondary flow space 21 of the secondary flow F2, and comprises air outlet ports 22 arranged downstream of the downstream transverse flange 15 and which are circumferentially distributed about the axis X.

Between the inner 12 and outer shells 13, and between the upstream 14 and downstream 15 transverse flanges, intermediate spaces 23 distributed about the axis X of the hub 10 are provided. The intermediate spaces 23 are located upstream of an inter-stream zone ZC, commonly designated by the term "core zone" or "core compartment".

The turbofan engine further comprises bleed streams, which extend between the inlet ports 19 and the outlet ports 22. Each bleed stream consists, from upstream to downstream between the corresponding inlet port 19 and outlet port 22, of one of the intermediate spaces 23 and then of a bleed duct 24. Each bleed duct 24 comprises an intermediate port 25, which opens into the intermediate space 23 at the upstream surface of the downstream transverse flange 15, and extends to an exhaust grid 26 called a "VBV grid", disposed at the outlet port 22. When a bleed valve 20 is in an open position, an air flow F3 catched by the same and called a bleed flow passes through the intermediate space 23, the bleed duct 24 and then joins the secondary flow space 21 by passing through the exhaust grid 26.

Thus, when the air flow rate that can enter the high pressure compressor 17 is reduced, an extra air in the primary flow space 18 can be discharged into the secondary flow space 21 by these bleed streams, thus avoiding pumping phenomena that can result in a deterioration or even a full destruction of the low pressure compressor 16.

In the example of FIG. 1, the bleed ducts 24 are attached on the one hand to the outer shell 13 and on the other hand to the downstream transverse flange 15. They are located in the inter-stream zone ZC of the turbofan engine which has a fire risk, because of many pieces of equipment disposed therewithin. Consequently, it turns out to be necessary to avoid any fresh air supply to a fire contained in this zone, from the primary flow or the secondary flow. To achieve this end, an air and fire seal can be disposed between the bleed duct 24 and the outer annular shell 13 on the one hand, and between the bleed duct 24 and the downstream transverse flange 15 on the other hand.

Patent application FR3036136 describes an O-ring air-fire seal disposed between the bleed duct and the outer annular shell of an intermediate casing hub. This seal is made of silicone and can comprise a superimposition of several fabrics plies, in particular of glass and/or ceramics.

This O-ring seal however quickly loses its efficiency when exposed to flame. Indeed, the temperature impairs the properties of materials which constitute the seal, in particular silicone, which can result in a seal failure and an air sealing disruption.

SUMMARY OF THE INVENTION

The invention aims at ensuring an air and fire sealing which is durable and reliable, at least for the first fifteen minutes of a fire, between a tubular shaped first member of a turbomachine and a second member of the turbomachine.

According to a first aspect of the invention, this aim is achieved by providing an air-fire seal designed to be attached to the first tubular member and to rest against the second member, this seal comprising:
an attachment base having an annular shape around a reference axis;
a first annular fire-stop lip extending from the attachment base over a first length; and a second annular air-sealing lip extending from the attachment base over a second length lower than the first length and facing the first lip.

Thus, by dissociating the air-sealing function and the fire sealing function by means of two lips facing each other, the efficiency and lifespan of the sealing solution are greatly improved. The first fire-stop lip acts as a barrier or shield against flame by protecting the second air-sealing lip located behind. The second air-sealing lip is not exposed to flame until the first fire-stop lip has not failed, which extends its lifetime in case of fire.

In a particular embodiment, the first fire-stop lip is located radially outermost relative to the reference axis and the second air-sealing lip is located radially innermost relative to the reference axis. This embodiment of the seal finds application in particular in a two-spool turbofan engine between a bleed duct and an intermediate casing hub. The seal is then mounted around the bleed duct.

In a preferential embodiment, the seal comprises a third annular fire-stop lip extending from the attachment base over a third length lower than the first length and radially disposed between the first fire-stop lip and the second air-sealing lip. The third fire-stop lip constitutes a further obstacle for flames, which further improves the lifespan of the seal.

The device according to the invention can also have one or more of the characteristics below, considered singly or according to any technically possible combination:
- the first fire-stop lip and the second air-sealing lip are tilted by an angle between 5° and 7° relative to the reference axis;
- the first fire-stop lip comprises plies of ceramic fibres embedded in an elastomeric material, such as silicone;
- the number of plies of ceramic fibres in the first fire-stop lip is between 1 and 3;
- the first fire-stop lip comprises a metal reinforcement embedded in an elastomeric material, such as silicone; and
- the second air-sealing lip is coated with an antifriction fabric.

A second aspect of the invention relates to an assembly comprising:
- a air-fire seal according to the first aspect of the invention;
- a first tubular member of a turbomachine, such as a bleed duct, provided with a flange on which the attachment base of the seal is attached; and
- a second member of the turbomachine, such as an intermediate casing hub, comprising a first contact surface of the first fire-stop lip and a second contact surface of the air-sealing second lip.

The seal is advantageously configured to prevent air from circulating between a first enclosure and a second enclosure disposed on either side of the seal.

Preferably, the first contact surface of the first fire-stop lip is perpendicular to the reference axis and the second contact surface of the second air-sealing lip is parallel to the reference axis.

Finally, a third aspect of the invention relates to a turbomachine, such as a two-spool turbofan engine, comprising an assembly according to the second aspect of the invention.

BRIEF DESCRIPTION OF THE FIGURES

Further characteristics and advantages of the invention will clearly appear from the description thereof given below, by way of indicating and in no way limiting purposes, in reference to the appended figures, in which.

For more clarity, identical or similar elements are marked by identical reference signs throughout the figures.

DETAILED DESCRIPTION OF AT LEAST ONE EMBODIMENT

Figure 2:
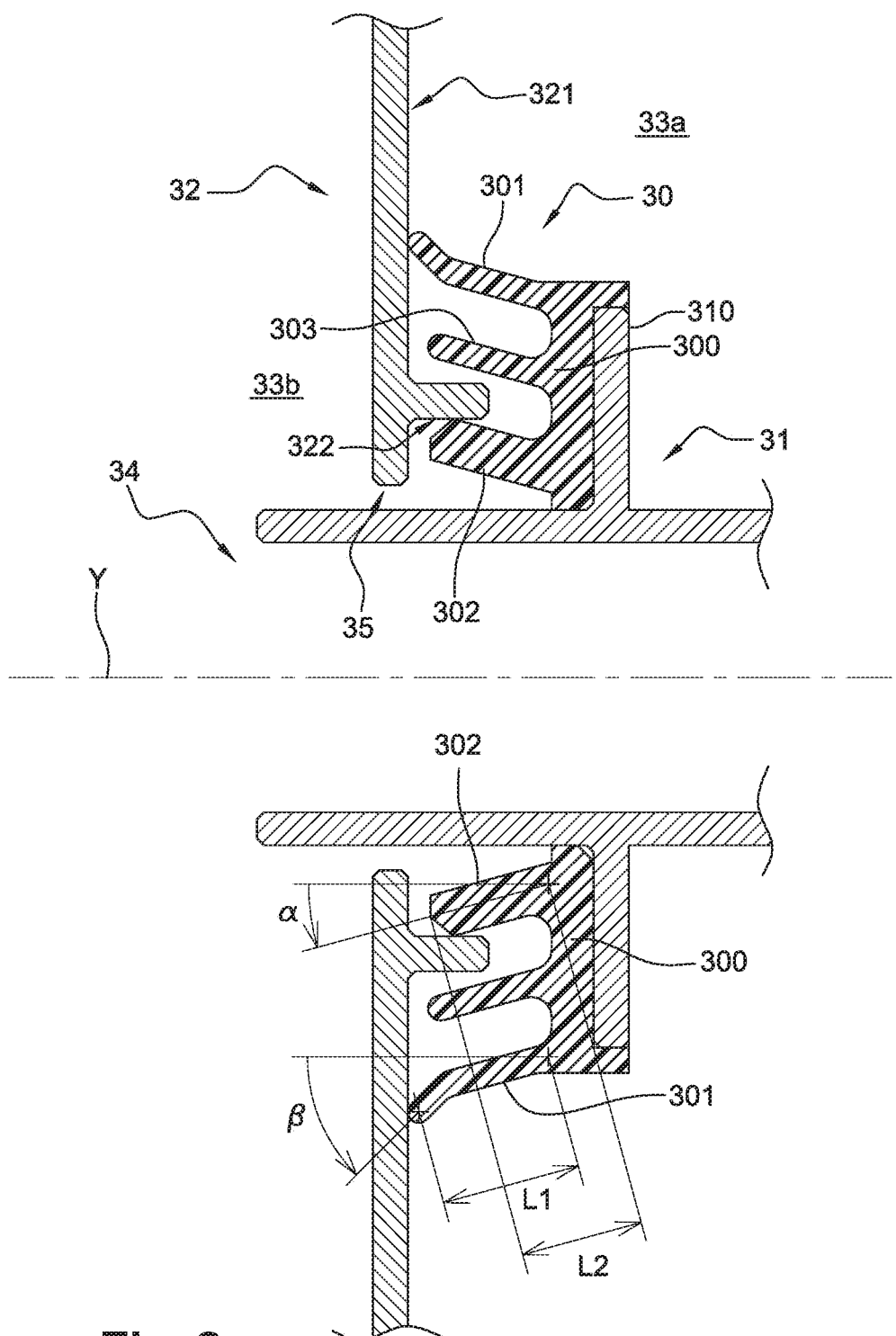
FIG. 2 is an axial cross-section view of an air-fire seal according to a preferential embodiment of the invention.

FIG. 2 shows an axial cross-section view of an air-fire seal 30 according to a preferential embodiment of the invention. The seal 30 is housed between a first member 31 of a turbomachine, such as a two-spool turbofan engine, and a second member 32 of the turbomachine. It is designed to ensure air and fire sealing between a first enclosure 33a and a second enclosure 33b disposed on either side of the seal 30 and delimited, at least partly, by the first and second members 31-32. In the example represented in FIG. 2, the first enclosure 33a is a zone of the turbofan engine with a fire risk and the second enclosure 33b is likely to be crossed by an air flow.

The first member 31, which is tubular shaped, occupies a port 34 of corresponding shaped provided in a first wall 321 of the second member 32. This port 34 being of dimensions slightly higher than the external dimensions of the first tubular member 31, there is a clearance 35 between the first and second members 31-32. The seal 30 is located in the immediate proximity of this clearance 35.

The seal 30 is advantageously symmetrical around a reference axis Y, which is the same as the symmetry axis of the first tubular member 31. It comprises a Y-axis annular attachment base 300 and at least two annular lips 301-302, coaxial with the attachment base 300. Both lips 301-302 extend facing each other from the attachment base 300 toward the second member 32.

Preferably, the attachment base 300 rests against a flange 310 of the first tubular member 31 and extends in a radial direction, that is perpendicular to the reference axis Y. The attachment base 300 can be bonded to the flange 310 prior to assembling the first and second members 31-32, for example by means of a silicone elastomer cross-linking at room temperature, or RTV (for "Room Temperature Vulcanising").

The first lip 301, disposed in this example radially outermost with respect to the reference axis Y, is a stop-fire type lip, that is it is designed to resist a fire that would take place in the first enclosure 33a and to stop the advance of this fire to the second enclosure 33b, at least temporarily. The first lip 301 is dimensioned to rest against the first wall 321 of the second member 32. The first lip 301 thus protects other parts of the seal 30 from fire, in particular the second lip 302. The first wall 321 of the second member 32 is preferably oriented perpendicular to the reference axis Y.

The second lip 302, disposed radially innermost relative to the reference axis Y, is an air-sealing lip. Its role is to maintain the second enclosure 33b under pressure by preventing the air flow from penetrating in the first enclosure 33a and from feeding the fire contained in this zone. The second lip 302 is of a length L2 lower than the length L1 of the first lip 301, so as not to contact the first wall 321, which would increase the mounting force of the first member 31

(equipped with the seal 30) with the second member 32. By way of example, the length L1 of the first lip 301 is about 9 mm and the length L2 of the second lip 302 is about 8 mm.

To ensure air-sealing, the second lip 302 rests against a second wall 322 of the second member 32, preferably oriented parallel to the reference axis Y. By way of example, this second wall 322 consists of an (Y-axis) annular rib set back relative to the port 34 and projecting from the first wall 321 towards the flange 310 of the first member 31.

Because it is substantially shorter than the first lip 301, the second lip 302 is free to slide along the second wall 322. This enables it not to be impacted by dimensional variations in the housing in view of axial manufacturing tolerances and compensate for possible axial movements between the first and second members 31-32 when the turbofan engine is operated.

By virtue of these arrangements, the second air-sealing lip 302 is radially rather than axially stressed. The stresses are low because they are essentially due to air pressure in the second enclosure 33b, and not upon mounting the first and second members 31-32. The deformation rate of the second lip 302 is thus low in comparison with the sealing solutions of prior art, which minimising damage or premature aging risks.

Advantageously, the second air-sealing lip 302 is tilted outwardly by an angle $\alpha$ between 5° and 7° relative to the reference axis Y and extends over its entire length in parallel to the first fire-stop lip 301. Further, as is represented in FIG. 2, the free end of the first lip 301, projecting from the second lip 302, can be further outwardly tilted, for example by an angle $\beta$ between 7° and 16° (still with respect to the reference axis Y). These tilts facilitate the mounting of the first and second members 31-32 and ensure a better air-fire sealing.

The seal 30 comprises, in this preferential embodiment of FIG. 2, a third fire-stop lip 303 disposed radially between the first lip 301 and the second lip 302. The length of this third lip 303 is lower than the length L1 of the first lip 301, for example equal to the length L2 of the second lip 302. The third lip 303 thus constitutes a further fire barrier, which will slowdown fire propagation after the first lip 301 has failed, by forming a chicane with the second wall 322 of the second member 32. Since it is not supposed to rest on either wall of the second member 32, this third lip 303 does not increase the mounting force. The third lip 303 preferably extends in parallel to the first lip 301. In other words, it is tilted outwardly by the angle $\alpha$.

The seal 30 can be built in different ways. In a first exemplary embodiment represented in FIG. 3, the seal 30 comprises ceramic fibres 40 embedded in a matrix 41 of a self-extinguishable silicone elastomer. The ceramic fibres 40 are preferably in the form of a fabric, as that marketed by the "3M" Company under the reference "Nextel™312". Such fibres are known to provide a large fire resistance but have a significant stiffness, which can increase the compression force of the seal upon mounting (the first lip 301 being more or less compressed as a function in particular of the dimensions of the members 31-32). The attachment base 300, the first fire-stop lip 301 and the third fire-stop lip 303, which all are likely to be exposed to fire, advantageously have a number of plies of ceramic fibres between 1 and 3. This range offers an excellent compromise between fire performance and mounting force. The second air-sealing lip 302 advantageously has a lower number of plies of ceramic fibres 40, for example a single ply, in order to provide it with further flexibility.

In a second exemplary embodiment, the seal 30 comprises a metal reinforcement 42 embedded in the matrix 41 of self-extinguishable silicone elastomer. The metal reinforcement 42, for example of steel, Hastelloy® or titanium, makes an efficient fire barrier. It extends preferentially in the attachment base 300, the first fire-stop lip 301 (except for its free end, such that this can bend in contact with the second member 32) and the third fire-stop lip 303. The second air-sealing lip 302 is preferentially free of metal reinforcement to accommodate more readily to movements and vibrations of the members 31-32.

In each of these exemplary embodiments, the second air-sealing lip 302 can be coated with an antifriction fabric 43 at its contact surface, in order to more readily slide on the second wall 322 of the second member 32. The antifriction fabric 43 is also resistant to high temperatures (up to 1100° C. in case of fire) and antistatic (in order not to create sparks). The antifriction fabric 43 is for example that marketed by the "DuPont" Company under "Nomex®".

Figure 3:
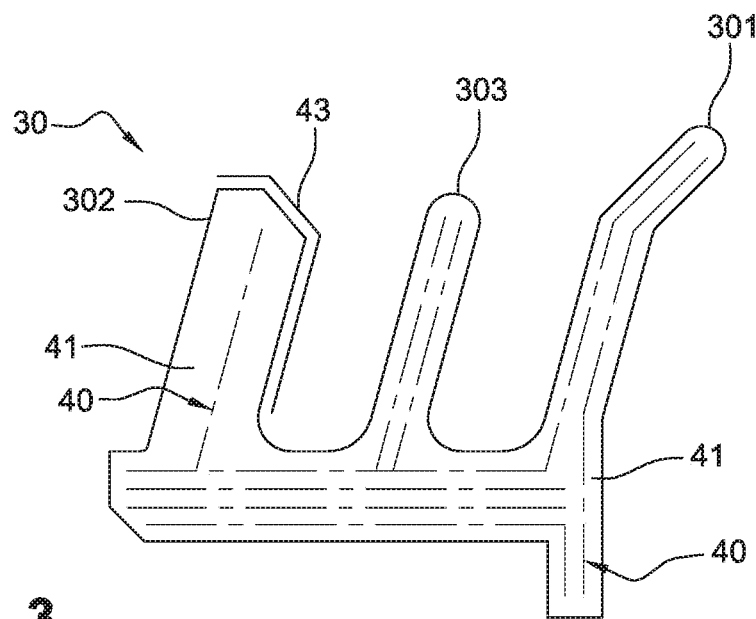
FIG. 3 illustrates a first exemplary embodiment of the air-fire seal according to the invention.
Figure 4:
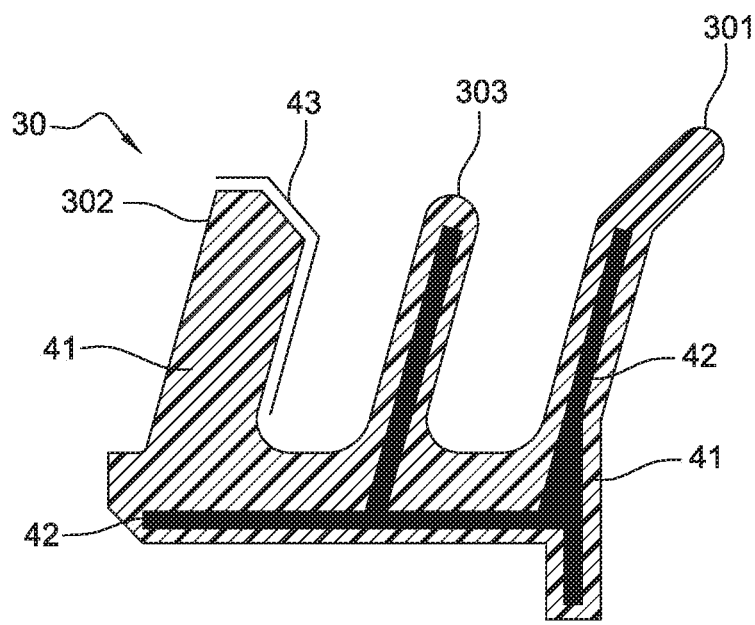
FIG. 4 illustrates a second exemplary embodiment of the air-fire seal according to the invention.

The seal 30 of FIGS. 2 to 4 can be used in different places of a turbomachine. A preferred application of the seal 30 relates to the bleed ducts of a two-spool turbofan engine. These ducts are for redirecting part of the primary flow to the secondary flow space. The bleed ducts can in particular be of the same type as that described in connection with FIG. 1. In reference to this figure, each duct comprises a first end opening into an intermediate space 23 of the intermediate casing hub 10 and a second end opening into the secondary flow space 21. The intermediate space 23 of the hub 10, in fluid communication with the primary flow space 18 through a bleed valve 20, is delimited by the inner 12 and outer 13 annular shells on the one hand and by the upstream 14 and downstream 15 transverse flanges on the other hand. Each bleed duct extends through the inter-stream zone or "core zone" ZC of the turbofan engine, which is known to be a zone with fire risk.

The seal 30 can thus be mounted around a bleed duct and cooperate with the downstream transverse flange 15 of the intermediate casing hub. In other words, in this application, the first tubular member 31 of FIG. 2 corresponds to the bleed duct, the second member 32 corresponds to the intermediate casing hub, and more particularly to its downstream transverse flange, the first enclosure 33a corresponds to the core zone ZC of the turbofan engine and the second enclosure 33b corresponds to the hub intermediate space.

The seal 30 has the advantage, because of its design, not to significantly impact the geometries of the bleed duct and of the intermediate casing hub. Indeed, a deep change in these geometries could increase the mass and manufacturing costs of the intermediate casing. The use of the seal 30 only requires a repositioning of the existing flange of the bleed duct and a provision of the surface of the downstream transverse flange on which the sealing second lip rests. The length of this contact surface (in the axial direction of FIG. 3) is at least 5 mm.

Figure 1:
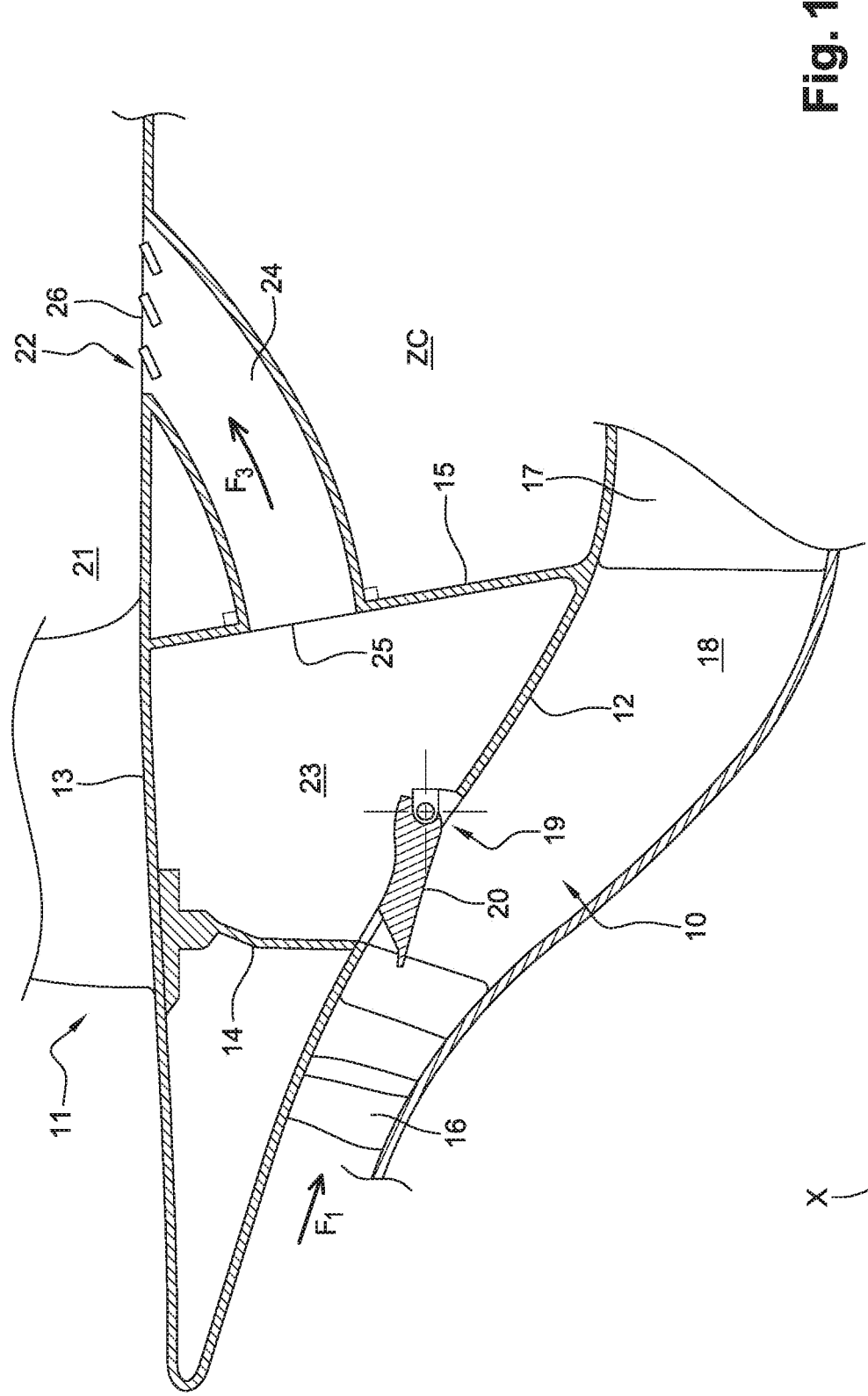
FIG. 1, previously described, is a partial axial cross-section view of an intermediate casing hub according to prior art.

In some two-spool turbofan engines, such as that partially represented in FIG. 1, the bleed ducts are pieces belonging to the intermediate casing hub. They are attached at their second end to the outer shell of the hub.

In other turbofan engines, the bleed ducts belong to an extension of the intermediate casing, commonly called "kit engine". This extension of the intermediate casing conventionally comprises several shell sectors which reform the secondary flow space and structural connecting arms enabling (electrical, mechanical, hydraulic) ancillary pieces of equipment to pass between the nacelle and the different components of the turbofan engine (core zone in particular).

The bleed ducts are then premounted on the shell sectors and then mounted by hand without specific tooling in the intermediate casing. The seal 30 is particularly adapted to this last type of turbofan engine, because it is designed to minimise the mounting force, as has been previously described.

Many variants and modifications of the seal according to the invention will appear to those skilled in the art. For example, in some places of the turbomachine, the location of the first and second enclosures 33a-33b can be reversed, that is the first enclosure 33a is travelled by an air flow and the second enclosure 33b has a fire risk. The positions of the first fire-stop lip 301 and the second air-sealing lip 302 will be also reversed. In other words, the first fire-stop lip 301 will be located radially innermost and the air-sealing second lip 302 will be located radially outermost. Finally, the lips 301-302 could be tilted (i.e. rotated) by the angle α in the other direction, that is inwardly.

Eventually, the composition of the seal 30 is not limited to the examples of materials described previously in connection with FIGS. 3 and 4. All or part of the ceramic fibres can in particular be replaced by glass fibres and elastomeric materials other than silicone can be used.

The invention claimed is:

1. An assembly comprising:
    a first tubular member of a turbomachine provided with a flange;
    a second member of the turbomachine comprising a first contact surface and a second contact surface, and
    an air-fire seal configured to be attached to the first tubular member, and to rest against the second member of the turbomachine, the air-fire seal including
        an attachment base having an annular shape around a reference axis, the attachment base being attached to the flange;
        a first annular fire-stop lip extending from the attachment base over a first length and resting against the first contact surface; and
        a second annular air-sealing lip extending from the attachment base over a second length lower than the first length and facing the first annular fire-stop lip, the second annular air-sealing lip resting against the second contact surface.

2. The assembly according to claim 1, wherein the first tubular member is a bleed duct of the turbomachine and the second member is an intermediate casing hub of the turbomachine.

3. The assembly according to claim 1, wherein the first contact surface of the second member is perpendicular to the reference axis and wherein the second contact surface of the second member is parallel to the reference axis.

4. The assembly according to claim 1, wherein the first fire-stop lip is located radially outermost relative to the reference axis and the second air-sealing lip is located radially innermost relative to the reference axis.

5. The assembly according to claim 1, wherein the first fire-stop lip and the second air-sealing lip are tilted outwardly by an angle between 5° and 7° relative to the reference axis.

6. The assembly according to claim 1, wherein the air-fire seal comprises a third annular fire-stop lip extending from the attachment base over a third length lower than the first length and radially disposed between the first fire-stop lip and the second air-sealing lip.

7. The assembly according to claim 1, wherein the first fire-stop lip comprises plies of ceramic fibres embedded in an elastomeric material.

8. The assembly according to claim 7, wherein the elastomeric material is silicone.

9. The assembly according to claim 7, wherein the number of plies of ceramic fibres in the first fire-stop lip is between 1 and 3.

10. The assembly according to claim 1, wherein the first fire-stop lip comprises a metal reinforcement embedded in an elastomeric material.

11. The assembly according to claim 10, wherein the elastomeric material is silicone.

12. The assembly according to claim 1, wherein the second air-sealing lip is coated with an antifriction fabric.

13. A turbomachine comprising an assembly according to claim 1.

14. The turbomachine according to claim 13, wherein the turbomachine is a two-spool turbofan engine.

* * * * *